US012559088B2

(12) United States Patent
Heath et al.

(10) Patent No.: US 12,559,088 B2
(45) Date of Patent: Feb. 24, 2026

(54) DRIVER ASSISTANCE BASED ON POSE DETECTION

(71) Applicant: Nissan North America, Inc., Franklin, TN (US)

(72) Inventors: Corey Heath, Scottsdale, AZ (US); Stefan Witwicki, San Carlos, CA (US)

(73) Assignee: Nissan North America, Inc., Franklin, TN (US)

( * ) Notice: Subject to any disclaimer, the term of this patent is extended or adjusted under 35 U.S.C. 154(b) by 173 days.

(21) Appl. No.: 18/240,921

(22) Filed: Aug. 31, 2023

(65) Prior Publication Data
US 2025/0074394 A1 Mar. 6, 2025

(51) Int. Cl.
| | |
|---|---|
| *B60W 30/00* | (2006.01) |
| *B60W 60/00* | (2020.01) |
| *G06T 7/73* | (2017.01) |
| *G06V 20/40* | (2022.01) |
| *G06V 20/59* | (2022.01) |

(52) U.S. Cl.
CPC .......... *B60W 30/00* (2013.01); *B60W 60/001* (2020.02); *G06T 7/73* (2017.01); *G06V 20/49* (2022.01); *G06V 20/597* (2022.01); *B60W 2540/22* (2013.01); *B60W 2540/221* (2020.02); *G06T 2207/10016* (2013.01); *G06T 2207/30196* (2013.01); *G06T 2207/30268* (2013.01)

(58) Field of Classification Search
CPC .. B60W 30/00; B60W 60/00; B60W 2540/00; G06T 7/00; G06T 2207/00; G06V 20/00; G06V 40/00
See application file for complete search history.

(56) References Cited

U.S. PATENT DOCUMENTS

| | | | | |
|---|---|---|---|---|
| 11,951,833 | B1 * | 4/2024 | Wu | G06V 20/46 |
| 12,277,779 | B2 * | 4/2025 | Asghar | G06V 20/597 |
| 2010/0033333 | A1 * | 2/2010 | Victor | A61B 5/7264 340/576 |
| 2016/0210500 | A1 * | 7/2016 | Feng | G06V 10/7553 |
| 2018/0239975 | A1 * | 8/2018 | Tamrakar | G06V 40/171 |
| 2020/0057487 | A1 * | 2/2020 | Sicconi | G06F 3/011 |
| 2021/0394775 | A1 * | 12/2021 | Julian | G06V 20/58 |
| 2021/0402942 | A1 * | 12/2021 | Torabi | G06N 3/02 |
| 2023/0065399 | A1 * | 3/2023 | Ren | B60W 40/09 |

(Continued)

OTHER PUBLICATIONS

Brownlee, "How to Use Power Transforms for Machine Learning", Aug. 28, 2020 (Year: 2020).*

(Continued)

*Primary Examiner* — Aniss Chad
*Assistant Examiner* — Elizabeth J Slowik
(74) *Attorney, Agent, or Firm* — Young Basile Hanlon & MacFarlane, P.C.

(57) ABSTRACT

A video of a driver of a vehicle is obtained. Based on subset of frames of the video, a series of body poses are identified. The series of body poses are identified by detecting landmark points associated with respective body parts of the driver. The landmark points correspond to coordinates of locations of pixels that represent at least one or more joints of the respective body parts of the driver in the subset of frames. A driver behavior is identified based on the series of the body poses. An assistive vehicle control action for the vehicle is output based on the driver behavior.

20 Claims, 6 Drawing Sheets

(56)                    References Cited

U.S. PATENT DOCUMENTS

| | | | |
|---|---|---|---|
| 2023/0214458 A1* | 7/2023 | Marsden | ................ G06V 40/28 |
| | | | 382/157 |
| 2024/0362931 A1* | 10/2024 | Katz | ...................... G06V 40/20 |

OTHER PUBLICATIONS

Pose Landmark Detection Guide; MediaPipe; accessed Aug. 31, 2023; https://developers.google.com/mediapipe/solutions/vision/pose_landmarker/.

* cited by examiner

500

510
OBTAIN VIDEO OF DRIVER

520
IDENTIFY SERIES OF BODY POSES OF THE DRIVER

530
IDENTIFY DRIVER BEHAVIOR

540
OUTPUT ASSISTIVE VEHICLE CONTROL ACTION

600

610

OBTAIN SENSOR DATA

620

IDENTIFY SERIES OF BODY POSES OF THE DRIVER

630

IDENTIFY DRIVER BEHAVIOR

640

DETERMINE STRESS LEVEL OF DRIVER

650

OUTPUT ASSISTIVE VEHICLE CONTROL ACTION

DRIVER ASSISTANCE BASED ON POSE DETECTION

TECHNICAL FIELD

This disclosure relates generally to driver assistance, and more particularly to driver assistance based on driver pose detection.

BACKGROUND

A vehicle may traverse different segments of a vehicle transportation network (e.g., a road). Traversing the different segments of the vehicle transportation network demands constant driver alertness and vigilance, requiring a driver to actively observe surroundings and evaluate a path forward. Attentiveness of the driver can affect smooth and safe operation of the vehicle.

SUMMARY

A first aspect of the disclosed implementations is a method that includes obtaining a video of a driver of a vehicle; identifying a series of body poses, in which each of the body poses is identified based on respective first subset of frames of the video; identifying a driver behavior based on the series of the body poses; and outputting an assistive vehicle control action for the vehicle based on the driver behavior.

A second aspect of the disclosed implementations is an apparatus that includes one or more sensors, a memory, and a processor. The processor is configured to execute instructions stored in the memory to: obtain a video of a driver of a vehicle; identify a series of body poses, in which each of the body poses is identified based on respective first subset of frames of the video; identify a driver behavior based on the series of the body poses; and output an assistive vehicle control action for the vehicle based on the driver behavior.

A third aspect of the disclosed implementations is a non-transitory computer readable medium storing instructions operable to cause one or more processors to perform operations. The operations include obtaining a video of a driver of a vehicle; identifying a series of body poses, in which each of the body poses is identified based on respective first subset of frames of the video; identifying a driver behavior based on the series of the body poses; and outputting an assistive vehicle control action for the vehicle based on the driver behavior.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements.

DETAILED DESCRIPTION

Figure 1:
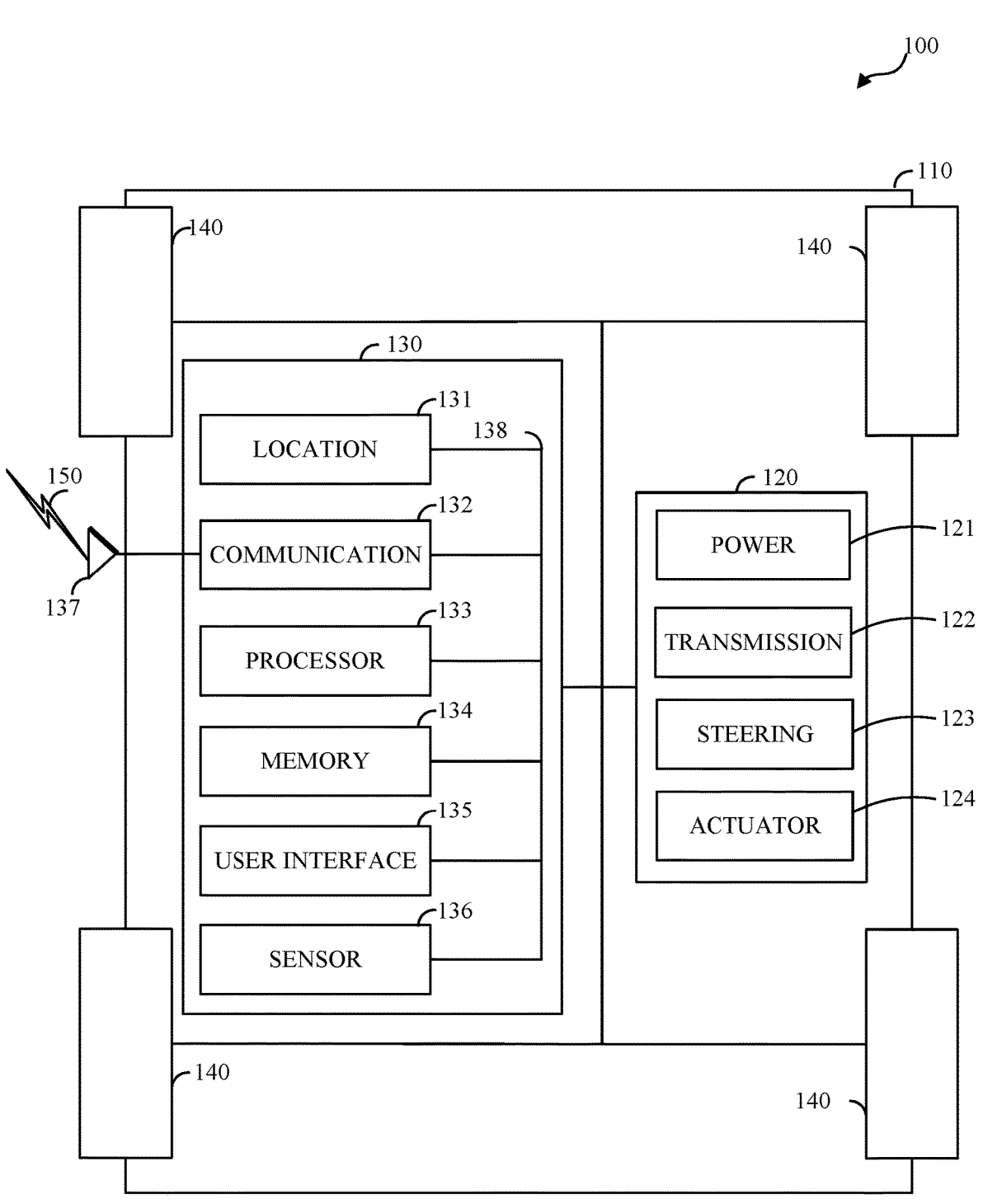
FIG. 1 is a diagram of an example of a vehicle in which the aspects, features, and elements disclosed herein may be implemented.

Monitoring a driver can help providing assistance to the driver. For instance, when the driver is stressed or agitated, a vehicle may automatically intervene with interactive controls such as turning down the radio or music volume, changing climate, and changing music, or the vehicle may take over the control of the vehicle. For instance, when the driver exhibits a behavior associated with reduced attention level or an emergency situation, the vehicle may intervene with an assistive action. For instance, when the driver exhibits a behavior that corresponds to a certain traffic situation, the vehicle may intervene with the assistive action.

One way to monitor the driver is by obtaining images of the driver. Traditional image analysis techniques involve key frame detection and shot detection, which analyze video data based on overall pixel changes.

Typically, dividing the video data into semantically relevant sub-clips is conducted by looking at the pixel color change between frames. The key frame detection examines a video and selects a series for frames that best summarizes what is depicted. The shot detection examines the video to determine when sufficient difference has occurred to indicate a change in the camera angle or the transition to a new scene.

But these traditional techniques are insufficient or inappropriate when only a driver activity depicted in the video may be of relevance in describing the scene. For example, the shot detection would be irrelevant if there is no change in the background scene. For example, key frame detection may summarize the overall movements of the driver but may fail to capture the driver activity (e.g., more nuanced aspects of the driver behavior).

Alternative to these approaches, driver poses (e.g., body posture of the driver) can be used to determine the driver activity when the cadence of the driver activity in a set of frames is sufficiently different from neighboring frames. For example, by determining the driver activity based on the driver poses, more nuanced aspects of driver behavior and/or interaction can be captured.

Moreover, there are no existing systems or technologies that can determine or analyze the driver activity or the driver behavior based on sensor data (e.g., real-time camera or video). Such analysis of the driver activity can include analyzing driver's different behaviors (or difference in driver's postures) that correspond to different traffic situations or different operational scenarios. By analyzing the driver's behaviors, the vehicle may assist the driver in making decisions about controlling the vehicle and/or the vehicle may be automatically controlled based on such analysis of different actions.

Moreover, when driver's different behaviors that correspond to the different traffic situations or the different operational scenarios are analyzed along with biometric data of the driver, correlation can be determined between the driver's different behaviors and the biometric data of the driver. Such correlation may be used to determine a stress level or cognitive state of the driver. As such, determined stress level of the driver may be used by the vehicle in assisting the driver in making decisions about controlling the vehicle, and/or the vehicle may be automatically controlled based on the stress level or the correlation.

Implementations according to this disclosure can be used to determine the driver behavior or the human behavior. After the video has been recorded or while the video is being recorded in real-time, a human pose estimation technique is used on one or more frames of the video to extract landmark body points, which may correspond to face, body, hand, eyes, legs, and/or other body points on each human represented in the sensor data. These landmark points represent the coordinates (e.g., Cartesian coordinates) of pixel locations for landmark body parts (e.g., face, body, hand, eyes, legs, and/or other body parts) in the frame. The change in the landmark points can be identified using different algorithms or techniques. The differences, similarities, or distance between these landmark points in at least some of the video frames or the sensor data may be determined. Such differences, similarities, or the distance may be used to identify body transition points that indicate a significant change in posture.

FIG. 1 is a diagram of an example of a vehicle in which the aspects, features, and elements disclosed herein may be implemented. In the embodiment shown, a vehicle 100 includes various vehicle systems. The vehicle systems include a chassis 110, a powertrain 120, a controller 130, and wheels 140. Additional or different combinations of vehicle systems may be used. Although the vehicle 100 is shown as including four wheels 140 for simplicity, any other propulsion device or devices, such as a propeller or tread, may be used. In FIG. 1, the lines interconnecting elements, such as the powertrain 120, the controller 130, and the wheels 140, indicate that information, such as data or control signals, power, such as electrical power or torque, or both information and power, may be communicated between the respective elements. For example, the controller 130 may receive power from the powertrain 120 and may communicate with the powertrain 120, the wheels 140, or both, to control the vehicle 100, which may include accelerating, decelerating, steering, or otherwise controlling the vehicle 100.

The powertrain 120 shown by example in FIG. 1 includes a power source 121, a transmission 122, a steering unit 123, and an actuator 124. Any other element or combination of elements of a powertrain, such as a suspension, a drive shaft, axles, or an exhaust system may also be included. Although shown separately, the wheels 140 may be included in the powertrain 120.

The power source 121 includes an engine, a battery, or a combination thereof. The power source 121 may be any device or combination of devices operative to provide energy, such as electrical energy, thermal energy, or kinetic energy. In an example, the power source 121 includes an engine, such as an internal combustion engine, an electric motor, or a combination of an internal combustion engine and an electric motor, and is operative to provide kinetic energy as a motive force to one or more of the wheels 140. Alternatively or additionally, the power source 121 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 122 receives energy, such as kinetic energy, from the power source 121, transmits the energy to the wheels 140 to provide a motive force. The transmission

122 may be controlled by the controller 130, the actuator 124, or both. The steering unit 123 may be controlled by the controller 130, the actuator 124, or both and control the wheels 140 to steer the vehicle. The actuator 124 may receive signals from the controller 130 and actuate or control the power source 121, the transmission 122, the steering unit 123, or any combination thereof to operate the vehicle 100.

In the depicted embodiment, the controller 130 includes a location unit 131, an electronic communication unit 132, a processor 133, a memory 134, a user interface 135, a sensor 136, and a communication interface 137. Fewer of these elements may exist as part of the controller 130. Although shown as a single unit, any one or more elements of the controller 130 may be integrated into any number of separate physical units. For example, the user interface 135 and the processor 133 may be integrated in a first physical unit and the memory 134 may be integrated in a second physical unit. Although not shown in FIG. 1, the controller 130 may include a power source, such as a battery. Although shown as separate elements, the location unit 131, the electronic communication unit 132, the processor 133, the memory 134, the user interface 135, the sensor 136, the communication interface 137, or any combination thereof may be integrated in one or more electronic units, circuits, or chips.

The processor 133 may include any device or combination of devices capable of manipulating or processing a signal or other information now-existing or hereafter developed, including optical processors, quantum processors, molecular processors, or a combination thereof. For example, the processor 133 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 133 is operatively coupled with one or more of the location unit 131, the memory 134, the communication interface 137, the electronic communication unit 132, the user interface 135, the sensor 136, and the powertrain 120. For example, the processor may be operatively coupled with the memory 134 via a communication bus 138.

The memory 134 includes any tangible non-transitory computer-usable or computer-readable medium, capable of, for example, containing, storing, communicating, or transporting machine readable instructions, or any information associated therewith, for use by or in connection with any processor, such as the processor 133. The memory 134 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

The communication interface 137 may be a wireless antenna, as shown, a wired communication port, an optical communication port, or any other wired or wireless unit capable of interfacing with a wired or wireless electronic communication medium 150. Although FIG. 1 shows the communication interface 137 communicating via a single communication link, a communication interface may be configured to communicate via multiple communication links. Although FIG. 1 shows a single communication interface 137, a vehicle may include any number of communication interfaces.

The electronic communication unit 132 is configured to transmit or receive signals via a wired or wireless electronic communication medium 150, such as via the communication interface 137. Although not explicitly shown in FIG. 1, the electronic communication unit 132 may be configured to transmit, receive, or both via any wired or wireless communication medium, such as radio frequency (RF), ultraviolet (UV), visible light, fiber optic, wireline, or a combination thereof. Although FIG. 1 shows a single electronic communication unit 132 and a single communication interface 137, any number of communication units and any number of communication interfaces may be used. In some embodiments, the electronic communication unit 132 includes a dedicated short range communications (DSRC) unit, an on-board unit (OBU), or a combination thereof.

The location unit 131 may determine geolocation information, such as longitude, latitude, elevation, direction of travel, or speed, of the vehicle 100. In an example, the location unit 131 includes a GPS unit, such as a Wide Area Augmentation System (WAAS) enabled National Marine-Electronics Association (NMEA) unit, a radio triangulation unit, or a combination thereof. The location unit 131 can be used to obtain information that represents, for example, a current heading of the vehicle 100, a current position of the vehicle 100 in two or three dimensions, a current angular orientation of the vehicle 100, or a combination thereof.

The user interface 135 includes any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 135 may be operatively coupled with the processor 133, as shown, or with any other element of the controller 130. Although shown as a single unit, the user interface 135 may include one or more physical units. For example, the user interface 135 may include both an audio interface for performing audio communication with a person and a touch display for performing visual and touch-based communication with the person. The user interface 135 may include multiple displays, such as multiple physically separate units, multiple defined portions within a single physical unit, or a combination thereof.

The sensors 136 are operable to provide information that may be used to control the vehicle. The sensors 136 may be an array of sensors. The sensors 136 may provide information regarding current operating characteristics of the vehicle 100, including vehicle operational information. The sensors 136 can include, for example, a LiDAR sensor, a speed sensor, acceleration sensors, a steering angle sensor, traction-related sensors, braking-related sensors, steering wheel position sensors, eye tracking sensors, seating position sensors, or any sensor, or combination of sensors, which are operable to report information regarding some aspect of the current dynamic situation of the vehicle 100.

The sensors 136 include one or more sensors 136 that are operable to obtain information regarding the physical environment (e.g., ground points, non-ground points) surrounding the vehicle 100, such as operational environment information. For example, one or more sensors may detect road geometry, such as lane lines, and obstacles, such as fixed obstacles, vehicles, and pedestrians. The sensors 136 can be or include one or more video cameras, laser-sensing systems, light pulse sensing system, infrared-sensing systems, acoustic-sensing systems, or any other suitable type of on-vehicle environmental sensing device, or combination of devices, now known or later developed. In some embodiments, the sensors 136 and the location unit 131 are combined.

Although not shown separately, the vehicle 100 may include a trajectory controller. For example, the controller 130 may include the trajectory controller. The trajectory controller may be operable to obtain information describing a current state of the vehicle 100 and a route planned for the vehicle 100, and, based on this information, to determine and optimize a trajectory for the vehicle 100. In some embodiments, the trajectory controller may output signals operable to control the vehicle 100 such that the vehicle 100 follows the trajectory that is determined by the trajectory controller. For example, the output of the trajectory controller can be an optimized trajectory that may be supplied to the powertrain 120, the wheels 140, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 140 may be a steered wheel that is pivoted to a steering angle under control of the steering unit 123, a propelled wheel that is torqued to propel the vehicle 100 under control of the transmission 122, or a steered and propelled wheel that may steer and propel the vehicle 100.

Although not shown in FIG. 1, a vehicle may include additional units or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 100 may be a non-autonomous vehicle or an electric vehicle (EV).

In some implementations, the vehicle 100 may be an autonomous vehicle that is controlled autonomously, without direct human intervention, to traverse a portion of a vehicle transportation network. Although not shown separately in FIG. 1, an autonomous vehicle may include an autonomous vehicle control unit that performs autonomous vehicle routing, navigation, and control. The autonomous vehicle control unit may be integrated with another unit of the vehicle. For example, the controller 130 may include the autonomous vehicle control unit.

When present, the autonomous vehicle control unit may control or operate the vehicle 100 to traverse a portion of the vehicle transportation network in accordance with current vehicle operation parameters. The autonomous vehicle control unit may control or operate the vehicle 100 to perform a defined operation or maneuver, such as parking the vehicle. The autonomous vehicle control unit may generate a route of travel from an origin, such as a current location of the vehicle 100, to a destination based on vehicle information, environment information, vehicle transportation network information representing the vehicle transportation network, or a combination thereof, and may control or operate the vehicle 100 to traverse the vehicle transportation network in accordance with the route. For example, the autonomous vehicle control unit may output the route of travel to the trajectory controller to operate the vehicle 100 to travel from the origin to the destination using the generated route.

Figure 2:
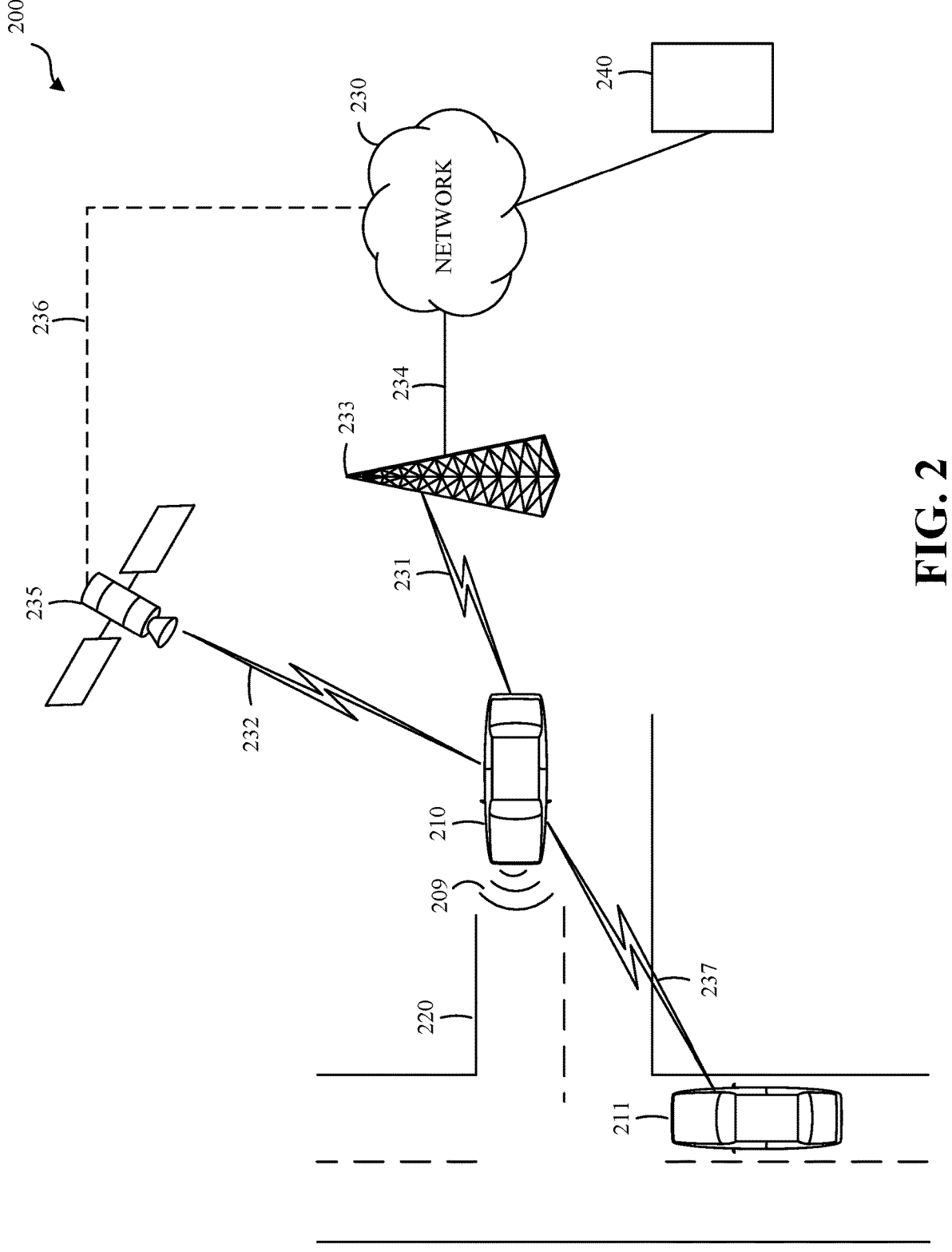
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 200 may include one or more vehicles 210/211, such as the vehicle 100 shown in FIG. 1, which travels via one or more portions of the vehicle transportation network 220, and communicates via one or more electronic communication networks 230. Although not explicitly shown in FIG. 2, a vehicle may traverse an off-road area.

The electronic communication network 230 may be, for example, a multiple access system that provides for communication, such as voice communication, data communication, video communication, messaging communication, or a combination thereof, between the vehicle 210/211 and one or more communication devices 240. For example, a vehicle 210/211 may receive information, such as information representing the vehicle transportation network 220, from a communication device 240 via the electronic communication network 230.

In some embodiments, a vehicle 210/211 may communicate via a wired communication link (not shown), a wireless communication link 231/232/237, or a combination of any number of wired or wireless communication links. As shown, a vehicle 210/211 communicates via a terrestrial wireless communication link 231, via a non-terrestrial wireless communication link 232, or via a combination thereof. The terrestrial wireless communication link 231 may include an Ethernet link, a serial link, a Bluetooth link, an infrared (IR) link, an ultraviolet (UV) link, or any link capable of providing for electronic communication.

A vehicle 210/211 may communicate with another vehicle 210/211. For example, a host, or subject, the vehicle 210 (HEV) may receive one or more automated inter-vehicle messages, such as a basic safety message (BSM), from a remote, or target, vehicle (RV) 211, via a direct communication link 237, or via the electronic communication network 230. The remote vehicle 211 may broadcast the message to host vehicles within a defined broadcast range, such as 300 meters. In some embodiments, the host vehicle (e.g., the vehicle 210) may receive a message via a third party, such as a signal repeater (not shown) or another remote vehicle (not shown). A vehicle 210/211 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 210 may communicate with the electronic communications network 230 via an access point 233. The access point 233, which may include a computing device, is configured to communicate with a vehicle 210, with the electronic communication network 230, with one or more communication devices 240, or with a combination thereof via wired or wireless communication links 231 and 234. For example, the access point 233 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit here, an access point may include any number of interconnected elements.

The vehicle 210 may communicate with the electronic communications network 230 via a satellite 235, or other non-terrestrial communication device. The satellite 235, which may include a computing device, is configured to communicate with a vehicle 210, with the communication network 230, with one or more communication devices 240, or with a combination thereof via one or more communication links 232 and 236. Although shown as a single unit here, a satellite may include any number of interconnected elements An electronic communication network 230 is any type of network configured to provide for voice, data, or any other type of electronic communication. For example, the electronic communication network 230 may include a local area network (LAN), a wide area network (WAN), a virtual private network (VPN), a mobile or cellular telephone network, the Internet, or any other electronic communication system. The electronic communication network 230 uses a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit here, an electronic communication network may include any number of interconnected elements.

The vehicle 210 may identify a portion or condition of the vehicle transportation network 220. For example, the vehicle includes at least one on-vehicle sensor 209, like the sensor 136 shown in FIG. 1, which may be or include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 220.

The vehicle 210 may traverse a portion or portions of the vehicle transportation network 220 using information communicated via the electronic communication network 230, such as information representing the vehicle transportation network 220, information identified by one or more on-vehicle sensor 209, or a combination thereof.

Although FIG. 2 shows one vehicle transportation network 220, one electronic communication network 230, and one communication device 240, for simplicity, any number of networks or communication devices may be used. The vehicle transportation and communication system 200 may include devices, units, or elements not shown in FIG. 2. Although the vehicle 210 is shown as a single unit, a vehicle may include any number of interconnected elements.

Although the vehicle 210 is shown communicating with the communication device 240 via the electronic communication network 230, the vehicle 210 may communicate with the communication device 240 via any number of direct or indirect communication links. For example, the vehicle 210 may communicate with the communication device 240 via a direct communication link, such as a Bluetooth communication link.

Figure 3:
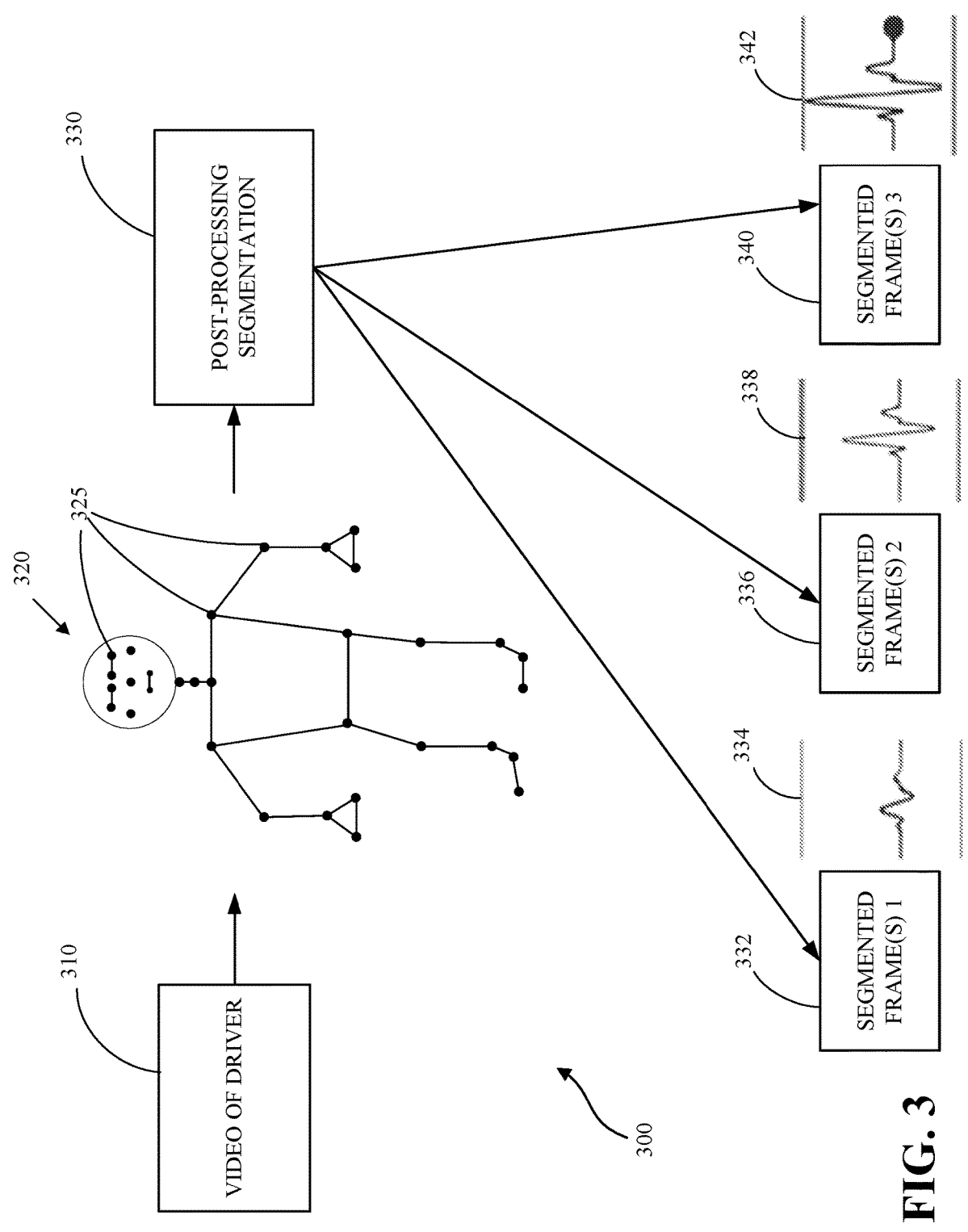
FIG. 3 depicts a diagram of an example of operations associated with determining a driver behavior.

FIG. 3 depicts a diagram 300 of an example of operations associated with determining a driver behavior. The example of operations depicted in the diagram 300 may be implemented in whole or in part by a processor, such as the processor 133 of a vehicle (e.g., the vehicle 100 or the vehicle 210), a controller (such as the controller 130), sensor(s) (such as the sensors 136), a human behavior estimation software 420, and/or other computing components.

At 310, a video (e.g., a set of consecutive images) of a driver is obtained from the sensor(s) of the vehicle. For example, the video of the driver may be obtained from a driver-facing camera (e.g., video camera) installed inside the vehicle. The video may include multiple subset of frames, where each subset of frames may include one or more frames. In some implementations, instead of taking or recording the video, the driver-facing camera may capture multiple images of the driver at certain time intervals (e.g., pre-determined). In either case, and for simplicity of explanation, the term "video" is used.

At 320, the pose estimation technique can be used to estimate a pose of the driver (e.g., a human) based on detection and/or selection of landmark points associated with respective body parts of the driver in the video frames. The landmark points may correspond to coordinates (e.g., Cartesian coordinates) of locations of pixels (pixel locations) that represent at least one or more joints 325 of the respective body parts of the driver in the video frames. Even though only some of points illustrated in the figure are labeled as the one or more joints 325, other points that are not labeled as the one or more joints 325 and other body parts that are not illustrated as points may be included in the one or more joints 325, and may correspond to the landmark points. For example, the one or more joints 325 may include joints of head, neck, torso (e.g., chest, abdomen, pelvis), upper limbs (e.g., shoulders, arms, hands), lower limbs (e.g., hips, legs, feet), spinal column, and/or other body parts. Moreover, the landmark points associated with respective body parts can also include the coordinates of the pixel locations representing eyes, iris, and/or pupils of the driver, and the eye gaze can be determined based on the respective coordinates. In some implementations, an eye-tracker may be used either alone or in combination with the driver-facing camera to determine the eye gaze of the driver. For example, the eye-tracker may include one or more cameras (other than the driver-facing camera used to capture the video or the images) with infrared illumination and/or algorithms to monitor and analyze the movement of the eyes or the point of eye gaze.

For example, through the pose estimation technique, x-y coordinates or x-y-z coordinates (collectively "coordinates") of the landmark points may be selected. Either the x-y coordinates or the x-y-z coordinates may be used for the landmark points. For example, the coordinates corresponding to joints of the head, upper limbs, and other landmarks points may be selected as a feature set for determining the pose or a series of poses of the driver.

For example, in case the coordinates represent the three-dimensional (3D) coordinates such as the x-y-z coordinates, detection, evaluation, estimation, or determination of the z coordinate of the landmark points in the video frames may be conducted in accordance with conventional techniques or a z coordinate value (z-value) estimation technique. The z-value estimation technique may include estimating the z-value based on assumptions about how the driver is positioned in a seat, or pose(s) of the driver detected (e.g., based on the x-y coordinates). For example, estimating the z-values may include setting an anchor point (represented in the x-y coordinates) or normalizing the anchor point, and determining the z-value based on distance and slope of a line between other body points or landmark points (that are represented in the x-y coordinates) and the anchor point. As such, the z-value may be relative to the other body points or the landmark points (that are represented in the x-y coordinates). To illustrate, the anchor point may be set at a neck or a joint associated with the neck, and anchor point value may be set as z=0 (e.g., normalized anchor point), and the z-value may be determined or estimated based on the distance and the slope of a line between the anchor point and the other body points or the landmark points (that are represented in the x-y coordinates) of the driver. Once the z-value is estimated or determined, then the z-value may be included in the landmark points of the video frames. Moreover, in some implementations, a machine-learning model (ML model) or a deep-learning model (DL model) may be trained to estimate or determine the z-value based on values of the x-y coordinates, and 3D dataset of drivers in different positions or poses in the driver's seat.

Figure 4:
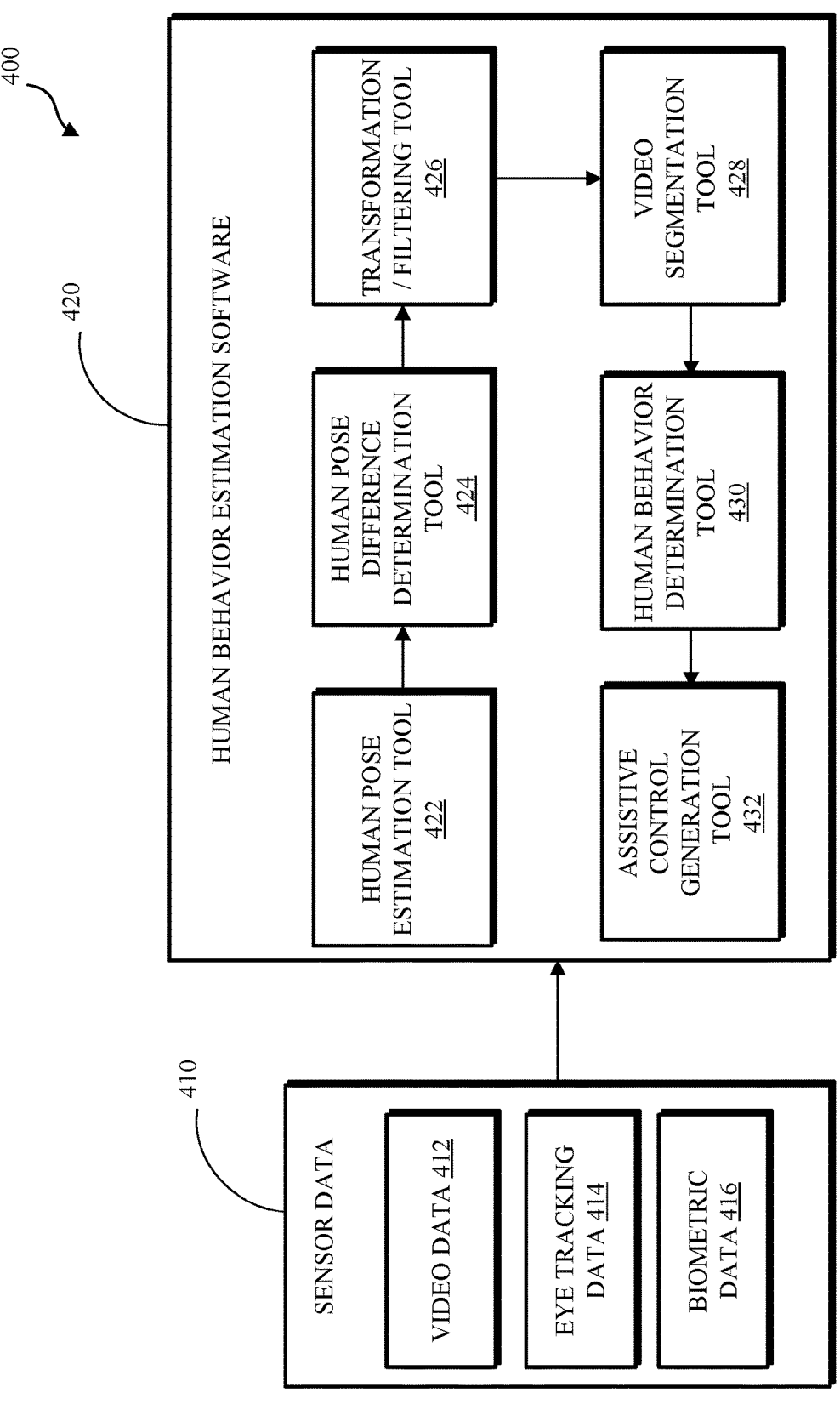
FIG. 4 depicts a diagram of an example of operations associated with processing sensor data and determining driver behavior and stress level.

Once the landmark points associated with respective body parts of the driver (or the human) in the video frames are detected and/or selected as feature set (e.g., by a human behavior estimation software 420), or the pose is determined in at least some (e.g., all) of the video frames or images, such landmark points or the pose or series of poses may be processed to determine the driver behavior in accordance with an example of operations described with respect to the human behavior estimation software 420 in FIG. 4. For example, processing such landmark points or the pose or series of poses may include steps to attenuate unwanted or unnecessary frames or corresponding signal data or steps to extract necessary frames or corresponding signal data that may be used in determining the driver behavior. In some implementations, identifying the pose or the series of poses may correspond to detecting and/or selecting the landmark points.

After processing the video frames or images (which includes processing the landmark points or the pose or series of poses), the driver behavior can be determined and/or the video can be segmented into the different subsets of frame(s) through post-processing segmentation 330, which divides the frames into one or more subsets. That is, in some implementations, the driver behavior can be determined and/or classified immediately after and during processing the video frames or images; in other implementations, the driver behavior can be determined and/or classified after processing the video frames or images and segmenting (or extracting) the video into the different subsets of frame(s).

For example, determining the driver behavior immediately after processing the video frames or images may include performing pattern (or feature) comparing techniques such wavelet transformation or dynamic time warping (DTW) to compare detected patterns of extracted signal data to the reference signal data to determine the driver behavior. For example, pattern (or feature) comparing techniques such as wavelet transformation or DTW can be used to compare detected patterns of signal data (that is associated with changes in the landmark points of the series of the body poses) to the reference signal data to determine the driver behavior.

For example, determining the driver behavior after processing the video frames or images and segmenting (or extracting) the video into the different subsets of frame(s) may include first segmenting the extracted signal data based on a threshold value (e.g., heuristic value) for determining the segmentation. For example, the threshold value may correspond to a predetermined value associated with signal data which correspond to a certain degree (e.g., magnitude) of motion or movement of the driver. For example, segmenting the extracted signal data based on the threshold value may include determining or extracting frame(s) that has corresponding signal data which exceeds or meets the threshold value. Thereafter, selected or extracted frame(s) may be added or combined to determine the driver behavior. For example, the video can be segmented into a first subset of frame(s) 332, a second subset of frame(s) 336, and a third subset of frame(s) 340 after determining that first signal data 334 associated with the first subset of frame(s) 332 meets or exceeds the threshold value, second signal data 338 associated with the second subset of frame(s) 336 meets or exceeds the threshold value, and the third signal data 342 associated with the third subset of frame(s) 340 meets or exceeds the threshold value. Thereafter, such three subsets of frames may be combined to determine the driver behavior. For example, consider a situation where the driver is at a four-way stop intersection, and the driver has to look sideways to see which other vehicles on a road has the right of way. In this situation, the video can be segmented into three subsets of frame(s), where the first subset of frame(s) 332 includes the driver looking to the left side (e.g., first pose), the second subset of frame(s) 336 includes the driver looking to the right side (e.g., second pose), and the third subset of frame(s) 340 includes the driver looking straight (e.g., third pose). These three subsets of frame(s) can be combined to determine the driver's conduct at the four-way stop intersection. For example, the signal data corresponding to these three subsets of frame(s) can be combined and pattern (or feature) comparing techniques such as wavelet transformation or DTW can be used to compare patterns of signal data to the reference signal data to determine the driver behavior (e.g., in this case, driver's conduct at the four-way stop intersection).

By doing so (e.g., segmenting or extracting videos into only frames or corresponding signal data necessary to determining the driver behavior), accuracy in pattern comparison and detection (e.g., wavelet transform) can be improved as irrelevant motions or movement can be further attenuated or removed and false-positive rate can be reduced. Moreover, noise can be further reduced, and/or computational efficiency and storage efficiency accuracy can be enhanced. Moreover, when a ML model is trained and utilized to determine and output the driver behavior (e.g., output an indication thereof) based on an input of determined pose or the series of the poses, training the ML model on only pertinent segments can lead to improved accuracy and performance. Moreover, prior to segmentation, segment size (e.g., number of segments, minimum number of segments) can be determined based on use-case goals which may include various motions (which have certain ranges of magnitude of motions or movement) and/or length of such motions, such that a certain number of frames or corresponding signal data necessary to determining the driver behavior can be combined.

Even though the video segmentation is described above with three segments, the video may be segmented into more or fewer segments.

The driver behavior can encompass various actions or responses indicative of the driver's conduct in specific traffic scenarios or given locations. The driver behavior may also signify the driver's level of attention, engagement with vehicle functionalities, health concerns, driving preparedness, emotional state, distractions, and so forth.

The driver behavior may provide certain clues or insights as to a traffic situation or a current location of the vehicle. As described above, for example, when the driver looks straight, and then looks rapidly from side to side, this behavior may correspond to a typical driver behavior at a stop (or stop sign) at an intersection (e.g., four-way stop intersection). For example, when the driver turns body and eyes to have quick, repeated glances to side mirrors or over their shoulder, this behavior may correspond to preparing for a lane change or checking blind spot. For example, the driver's body movement in a certain way may correspond to abruptly stopping the vehicle followed by a long pause without moving, which may in turn reflect that the driver stopped the vehicle at a red light or a railway crossing awaiting a train to pass.

The driver behavior may reflect the attention level of the driver. For example, if the driver leans forward, it could suggest that they are attempting to get a clearer view of something in front, signaling a heightened sense of focus, interest, or curiosity.

The driver behavior can reflect the interaction with vehicle controls. For example, when the driver moves their hands and tries to reach for controls like radio, air conditioning, or navigation system, such movement may indicate that the driver is trying to interact with vehicle control system.

The driver behavior can indicate potential health concerns. For instance, if the driver exhibits unusual movements (such as sudden slumping or displaying erratic motions), it could suggest the driver is experiencing medical emergencies, such as a stroke, heart attack, or seizure.

The driver behavior can indicate their preparedness to drive. For instance, if the driver places their hands on the steering wheel in a specific position, it might suggest that they are alert and poised to drive.

The driver behavior may reveal their emotional state. For example, tense (e.g., elevated) shoulders could signal stress or anxiety. Similarly, frequent head shaking or rapidly turning the head in different directions can suggest feelings of agitation or frustration.

In some implementations, the ML model (which may be a DL model) may be trained and utilized to determine and output the driver behavior (e.g., output an indication thereof) based on an input of determined pose or the series of the poses. For example, the ML model may classify the pose into a driver behavior.

Moreover, after the driver behavior is determined, next take of the video may be initiated in determining a next pose or next series of poses of the driver.

Moreover, the driver behavior may be determined or analyzed in real-time or after the video is recorded. If the driver behavior is determined in real-time, then the vehicle may output assistive vehicle control actions, such as described with respect to FIG. 5 or FIG. 6. If the driver behavior is determined and/or analyzed after the video is recorded, then such driver behavior may be used for various purposes including laboratory study and study of correlations (e.g., between the driver behavior and various traffic situations, between the driver behavior and stress level, etc.). Moreover, even though the example of operations in the diagram 300 is described with respect to determining the driver behavior and segmenting the videos based on the driver behavior, such example of the operations in the diagram 300 can be applied in determining and/or analyzing a behavior of a human (e.g., in real-time or through recorded video) in a context outside driving, such as when the human is engaged in a non-driving activity (e.g., solo, dyadic, or group activities).

FIG. 4 depicts a diagram 400 of an example of operations associated with processing sensor data and determining the driver behavior and/or stress level. The diagram 400 includes a human behavior estimation software 420 that uses sensor (e.g., camera) data to identify a driver behavior and output an assistive vehicle control action for the vehicle based on the driver behavior. The human behavior estimation software 420 receives sensor data 410. The sensor data 410 may include video data 412, eye tracking data 414, and biometric data 416.

The video data 412 may correspond to a video obtained from one or more video cameras or one or more driver-facing cameras, as described with respect to FIG. 3. The eye tracking data 414 may include data associated with movement of the eyes or the point of gaze obtained from the eye-tracker, the video camera, or the driver-facing camera, as described with respect to FIG. 3. The biometric data 416 may include data associated with galvanic skin response, heartrate, electroencephalogram (EEG), functional magnetic resonance imaging (fMRI), or other physiological or cognitive parameter of a human (e.g., driver). The biometric data 416 may be obtained from a wearable device (e.g., wristwatch, headset) and/or any installed device (e.g., EEG installed on a headrest of driver seat in the vehicle).

The video data 412 is necessary data in determining a human behavior (e.g., the driver behavior), and the eye tracking data 414 and/or the biometric data 416 may be optionally used in combination with the video data 412 in determining the human behavior and/or stress level of the human.

The sensor data 410 may be synchronized, combined, annotated, or layered at different time steps before, during, or after being processed by a human behavior estimation software 420.

The human behavior estimation software 420 may include tools, such as programs, subprograms, functions, routines, subroutines, operations, executable instructions, and/or the like for, inter alia and as further described below, identifying a driver behavior and outputting assistive driver control actions.

At least some of the human behavior estimation software 420 can be implemented as respective software programs that may be executed by one or more computing devices, a processor (such as the processor 133). A software program can include machine-readable instructions that may be stored in a memory (such as the memory 134), and that, when executed by the processor, may cause the computing device to perform the instructions of the software program. As shown, the human behavior estimation software 420 may include a human pose estimation tool 422, a human pose difference determination tool 424, a transformation and filtering tool 426, a video segmentation tool 428, a human behavior determination tool 430, and an assistive control generation tool 432. In some implementations, the human behavior estimation software 420 can include more or fewer tools. In some implementations, some of the tools may be combined, some of the tools may be split into more tools, or a combination thereof.

The human pose estimation tool 422 may estimate a pose or a series of the poses of the human based on detection or selection of landmark points associated with respective body parts of the human in the video frames (of the video or video data). The landmark points may correspond to the coordinates of the pixel locations representing at least one or more joints of the respective body parts of the human in the video frames. For example, the one or more joints may include joints of head, neck, torso, upper limbs, lower limbs, spinal column, and/or other body parts. Moreover, the landmark points associated with respective body parts can also include the pixel locations representing eyes, iris, and/or pupils of the driver, and the eye gaze can be determined based on the respective coordinates.

The pose or the series of the poses of the human may be estimated as described above with respect to the pose estimation technique of the diagram 300 of FIG. 3. The human pose estimation tool 422 may detect and/or select coordinates of the landmark points as feature set(s) for processing. For example, the coordinates corresponding to joints of the head, upper limbs, and other landmarks points may be selected as a feature set for determining the pose or a series of poses of the human.

The human pose difference determination tool 424 may determine changes in the series of the body poses. For example, Euclidian distance between the landmark points of two adjacent frames is calculated to determine how similar the frames are to one another. For example, for each frame, a respective pose identified in the frame may be compared with a respective pose identified in a previous (e.g., immediately preceding) frame, and a Euclidian distance between corresponding landmark points between the respective poses may be determined (e.g., measured or calculated). For example, the Euclidian distance between the corresponding landmark points between the respective poses may take a form of below equation (1).

$$d_{N+1,N} = \sqrt{\sum\nolimits_{m=1,M} (LP_{N+1,m} - LP_{N,m})^2} \qquad (1)$$

In equation (1), the pose is represented by a set of landmark points (LPs) each at a respective position space. For example, in frame N, assuming M landmark points, then the pose can be represented by $LP_{N,m}(x_m, y_m, z_m)$, for m=1 to M. Moreover, $d_{N+1,N}$ is a Euclidian distance between the corresponding landmark points between a respective pose depicted in frame N+1 ($LP_{N+1,m}$) and a respective pose depicted in the previous frame N ($LP_{N,m}$). Such Euclidian distance between the landmark points of adjacent frames may be determined for multiple sets of adjacent video frames of the video or video data. Moreover, equation (1) is shown for illustrative purposes and equation(s) other than equation 1 may be used to determine the Euclidian distance between the corresponding landmark points between the respective poses. For example, equation such as $d_{N+1, N} = \sum_{m=1,M} abs(LP_{N+1,m} - LP_{N,m})$ where "abs( )" indicates absolute value function, or other equations may be used.

The transformation and filtering tool 426 may differentiate or amplify rapid changes of movement in the series of the body poses. For example, a signal transformation (e.g., power transformation) can be applied to the changes in the series of the body poses. For example, the signal transformation can be applied such that the Euclidean distance value(s) (e.g., differences between the landmark points of adjacent frames, Euclidean distance differences) for dissimilar poses (e.g., of the dissimilar frames) can be more pronounced. For example, the Euclidean distance value(s) may be squared to amplify the Euclidean distance value(s). Moreover, a filter may be applied to smooth a small frequency change while preserving large frequency change, where the small frequency change may correspond to slow changes in the series of the body poses. For example, a high-pass filter may be applied to power transformed data such that frequencies of signals (representing slow changes in the series of the body poses) that are less than a threshold frequency (e.g., pre-determined threshold frequency) can be attenuated or reduced. In some implementations, without applying the power transformation, or amplifying (or differentiating) the rapid movement or the Euclidean distance value(s) between adjacent frames, the filter may be applied to the video data to smooth the small frequency change while preserving the large frequency change. In some implementations, without applying the power transformation, or amplifying (or differentiating) the rapid movement or the Euclidean distance value(s) between adjacent frames, the filter may be applied to the video data to only filter out noise associated with the signals.

After the transformation and/or filtration of signal data or data representing the differences between the landmark points of adjacent frames or the Euclidian distance, the human behavior can be determined and/or the video can be segmented into the different subsets of frame(s). That is, in some implementations, the human behavior can be determined and/or classified immediately after and during processing (e.g., steps with respect to landmark point selection, transformation, and/or filtration) the video frames or images; in other implementations, the human behavior can be determined and/or classified after processing the video frames or images and segmenting the video into the different subsets of frame(s).

For example, determining the driver behavior immediately after processing the video frames or images may include performing, through use of the human behavior determination tool 430, pattern (or feature) comparing techniques such wavelet transformation or DTW to compare detected patterns of extracted signal data to the reference signal data to determine the human behavior. For example, frequency components of signal data extracted after the transformation and/or the filtration can be compared with reference frequency of a certain human behavior. The human behavior may include any examples of the driver behaviors that are described above with respect to FIG. 3.

For example, determining the human behavior after processing the video frames or images and segmenting the video into the different subsets of frame(s) may include first segmenting the extracted signal data based on a threshold value (e.g., heuristic value) for determining the segmentation. For example, the video segmentation tool 428 may first segment the extracted signal data based on the threshold value. For example, the threshold value may correspond to a predetermined value associated with signal data which correspond to a certain degree (e.g., magnitude) of motion or movement of the human. For example, segmenting the extracted signal data based on the threshold value may include determining or extracting frame(s) that has corresponding signal data which exceeds or meets the threshold value. Thereafter, the video segmentation tool 428 may add or combine the segmented frame(s), and the human behavior determination tool 430 can determine the human behavior based on combined segmented frames, as described above with respect to FIG. 3. For example, the signal data corresponding to the extracted subsets of frame(s) can be combined and pattern (or feature) comparing techniques such as wavelet transformation or DTW can be used to compare patterns of signal data to the reference signal data to determine the human behavior.

Moreover, prior to segmentation, segment size (e.g., number of segments, minimum number of segments) can be determined based on use-case goals which may include various motions (which have certain ranges of magnitude of motions or movement) and/or length of such motions, such that a certain number of frames or corresponding signal data necessary to determining the human behavior can be combined.

In some implementations, the ML model may be trained and utilized to determine and output the human behavior based on an input data that represents determined pose or the series of the poses or the extracted signal data.

Moreover, the biometric data 416 may be used by the human behavior determination tool 430 to determine a stress level of the human. For example, the stress level of the human can be determined based on a correlation between the biometric data 416 and the human behavior. For example, when the human exhibits behaviors that demonstrate irritability, anxiety or panic attacks, tremors or shaking, headaches, the biometric data 416 (such as galvanic skin response, heartrate, EEG, fMRI, or other physiological or cognitive parameter) can be correlated with the human behavior to determine the stress level of the human. For example, even when the human exhibits behaviors that are not expressly associated with stress, such as when engaging in regular activity, those behaviors can be used along with biometric data 416 to analyze and/or determine stress level based on reference data that indicates correlations between such behaviors and the biometric data 416.

In some implementations, the stress level of the driver can be determined based on a correlation between the biometric data, the driver behavior (e.g., human behavior), and certain traffic situations. For example, the driver may be involved in traffic congestion or near-miss incidents or other incidents which may be stressful situations for the driver. In those situations, the driver may exhibit certain behaviors that they specifically have or go through. For example, when the driver behavior is determined based on patterns of the extracted signals, trained ML model and/or DL model, the driver behavior may also be determined and/or classified by certain traffic situations. For example, certain traffic situations can be determined based on scene understanding. The scene understanding may involve processing data from various sensors (e.g., the sensors 136) of the vehicle to detect features of physical environment surrounding the vehicle and creating a detailed representation of the physical environment. This can include identifying other vehicles, pedestrians, cyclists, road signs, traffic signals, lane markings, etc. Moreover, HD map data can be used in addition to such data obtained from the sensors to predict and interpret the traffic situation, and type of current road or upcoming road that the vehicle will be traversing.

Moreover, the human behavior may be determined or analyzed in real-time or after the video is recorded. In a context of driving, if the driver behavior is determined in real-time, then the assistive control generation tool 432 may generate assistive vehicle control actions and the vehicle may output assistive vehicle control actions, such as described with respect to FIG. 5 or FIG. 6. If the human behavior is determined and/or analyzed after the video is recorded, then such human behavior may be used for various purposes including laboratory study and study of correlations (e.g., between the human behavior and stress level, etc.).

Figure 5:
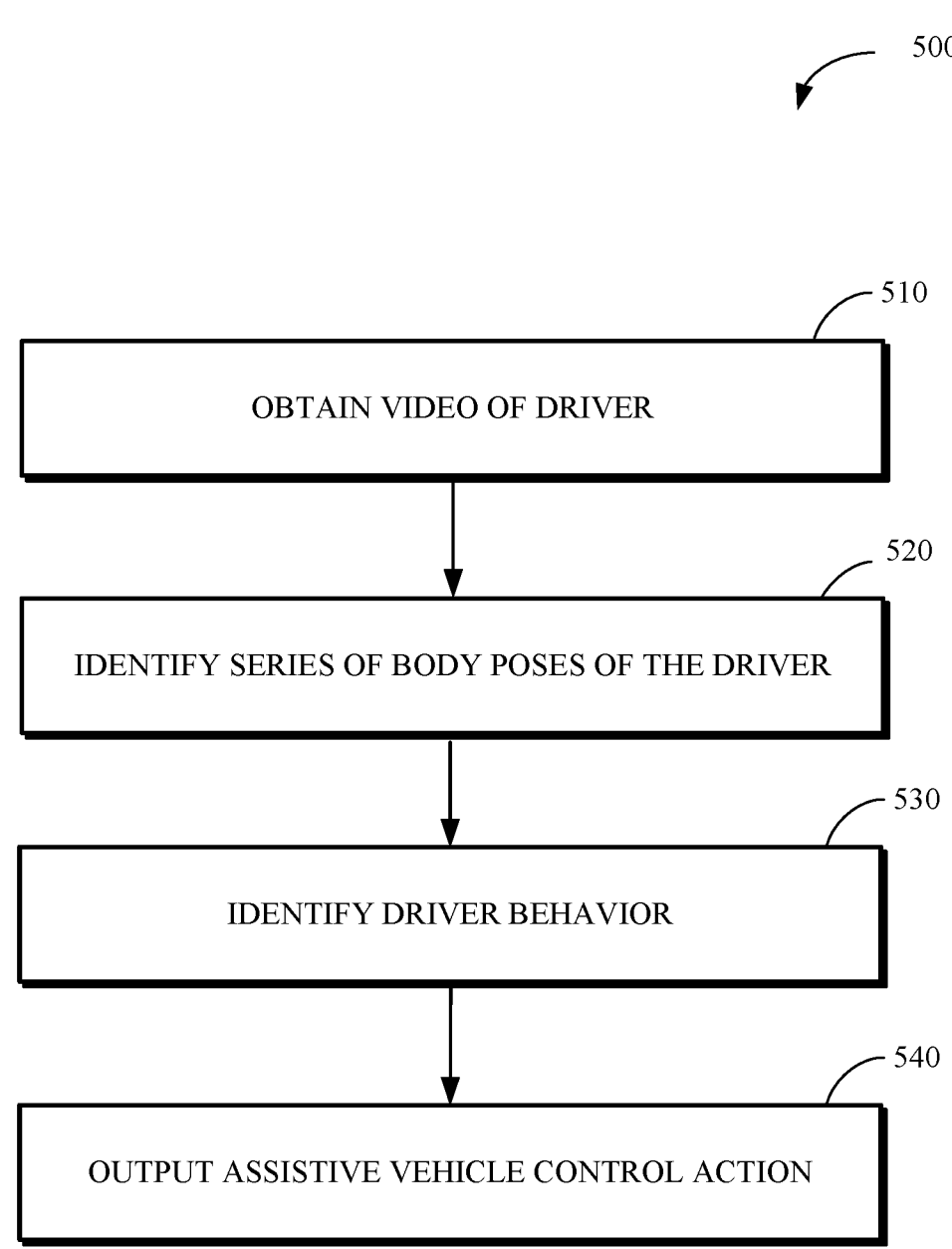
FIG. 5 is a flowchart diagram of an example of a technique for identifying a driver behavior.

FIG. 5 is a flowchart diagram of an example of a technique 500 for identifying a driver behavior. The technique 500 may be implemented by a processor, such as the processor 133 of a vehicle (e.g., the vehicle 100 or the vehicle 210), a controller (such as the controller 130), sensor(s) (such as the sensors 136), other components of the vehicle, the human behavior estimation software 420, and/or other computing components.

At 510, a video of a driver is obtained. The video of the driver may be obtained by one or more sensors of the vehicle. For example, a driver-facing camera may be used to obtain real-time video or recorded video. For example, the driver-facing camera may be located in any feasible location within or on the vehicle to monitor movement of respective body parts of the driver. For example, one or more driver-facing camera may be installed at dashboard, steering column, rearview mirror, door, ceiling, A-pillar or B-pillar, center console, or any other feasible locations to monitor movements of the respective body parts of the driver. In some implementations, the eye-tracker may be used in addition to the driver-facing camera to track movement of eyes or a point of gaze of the driver.

At 520, a series of body poses of the driver is identified. Identifying the series of body poses may include detecting landmark points associated with respective body parts of the driver from the respective first subset of the frames. The landmark points may correspond to the coordinates of the pixel locations representing at least one or more joints of the respective body parts of the driver in the respective first subset of the frames. For example, as described above, the one or more joints may include joints of head, neck, torso (e.g., chest, abdomen, pelvis), upper limbs (e.g., shoulders, arms, hands), lower limbs (e.g., hips, legs, feet), spinal column, and/or other body parts. Moreover, the landmark points associated with the respective body parts can also include the coordinates of the pixel locations representing eyes, iris, and/or pupils of the driver, and the eye gaze can be determined based on the respective coordinates.

For example, the coordinates of the landmark points may be detected and/or selected. For example, the coordinates corresponding to joints of the head, upper limbs, and other landmarks points may be selected as a feature set for determining the pose or a series of poses of the driver.

At 530, the driver behavior is identified. The driver behavior may be identified based on the series of the body poses. For example, the body pose or the series of the body poses can be processed in accordance with techniques described with respect to the human behavior estimation software 420 of FIG. 4, to identify or determine the driver behavior. For example, identifying the driver behavior based on the series of the body poses may include determining changes in the series of the body poses. The changes in the series of the body poses may correspond to Euclidean distance differences (e.g., Euclidean distance values) between the landmark points of respective body parts of the driver in adjacent frames of the first subset of the frames. Moreover, for example, identifying the driver behavior based on the series of the body poses may further include applying a power transformation to the Euclidean distance differences and/or applying a high-pass filter to power transformed data such that frequencies of signals representing slow changes in the series of the body poses that are less than a pre-determined threshold frequency are attenuated or reduced.

The driver behavior can encompass various actions or responses indicative of the driver's conduct in specific traffic scenarios or given locations. The driver behavior may also signify the driver's level of attention, engagement with vehicle functionalities, health concerns, driving preparedness, emotional state, distractions, and so forth.

For example, the driver behavior may reflect the attention level of the driver. For example, if the driver leans forward, it could suggest that they are attempting to get a clearer view of something in front, signaling a heightened sense of focus, interest, or curiosity.

The driver behavior can reflect the interaction with vehicle controls. For example, when the driver moves their hands and tries to reach for controls like radio, air conditioning, or navigation system, such movement may indicate that the driver is trying to interact with vehicle control system.

The driver behavior can indicate potential health concerns. For instance, if the driver exhibits unusual movements (such as sudden slumping or displaying erratic motions), it could suggest the driver is experiencing medical emergencies, such as a stroke, heart attack, or seizure.

The driver behavior can indicate their preparedness to drive. For instance, if the driver places their hands on the steering wheel in a specific position, it might suggest that they are alert and poised to drive.

The driver behavior may reveal their emotional state. For example, tense (e.g., elevated) shoulders could signal stress or anxiety. Similarly, frequent head shaking or rapidly turning the head in different directions can suggest feelings of agitation or frustration.

At 540, assistive vehicle control action is output. Depending on different types of driver behaviors, different assistive vehicle control action may be output. For example, when the driver behavior is associated with certain traffic situations (e.g., driver behavior where the driver is looking straight, then looks rapidly from side to side, then returning to looking straight corresponds to a traffic situation or a context in which the driver is at a stop in an intersection), the assistive vehicle control action may include the vehicle communicating recommended action (e.g., wait for two more seconds, the driver may proceed) with the driver through interactive display or speakers of the vehicle, and/or initiating automatic vehicle control (e.g., autonomously controlling or autonomously driving the vehicle according to the traffic situations or context). In some implementations, other sensors of the vehicle (e.g., LiDAR) and/or the scene understanding technique (described above with respect to FIG. 4), may be used in addition to the driver behavior in determining the assistive vehicle control action.

For example, when the driver behavior is associated with reduced attention level or interaction with vehicle controls (e.g., hand and/or body movement reaching for controls like radio, air conditioning, navigation system, and/or other interactive controls), the vehicle may communicate warnings to the driver through interactive display or speakers of the vehicle, ask the driver what actions or controls the driver is seeking for, take control over the vehicle (e.g., autonomously controlling or autonomously driving the vehicle) while the driver is interacting with interactive vehicle controls such as the radio, air conditioning, the navigation system, and/or automatically control the interactive vehicle controls.

For example, when the driver behavior is associated with health issues or irregular movements (e.g., the driver suddenly slumping over or showing jerky, irregular movements, which indicate potential medical issues such as stroke, heart attack, or seizure), then the vehicle may ask (e.g., through speakers, display interface) the driver whether the vehicle should call 911 or report this emergency to appropriate agencies or institutions that handle such emergencies, and when the driver does not answer within certain threshold time, then the vehicle may call 911 and/or report such emergency. In some implementations, the vehicle may call 911 and/or report such emergency without asking the driver for his or her input (e.g., voice input, input through interactive display of the vehicle).

For example, when the driver behavior is associated with readiness to drive (e.g., hand(s) position on a wheel (steering wheel) before starting or turning on an engine of the vehicle, both hands on the wheel in "10 and 2" or "9 and 3" position), then the vehicle may automatically start or turn on the engine.

For example, when the driver behavior is associated with increased stress level or agitation (e.g., frequently shaking the head or moving the head in various directions in quick succession), the vehicle may automatically intervene with interactive controls such as turning down the radio or music volume, changing climate, and/or changing music, or the vehicle may take over the control of the vehicle such that the driving can be autonomously controlled.

For example, when the drive behavior is associated with distraction (e.g., the driver looking down over threshold time, the driver extending hand(s) and/or body to a passenger seat, back seat, or glove box), the vehicle may communicate warnings to the driver through interactive display or speakers of the vehicle, ask the driver what actions or controls the driver is seeking for, and/or take control over the vehicle (e.g., autonomously controlling or autonomously driving the vehicle).

Figure 6:
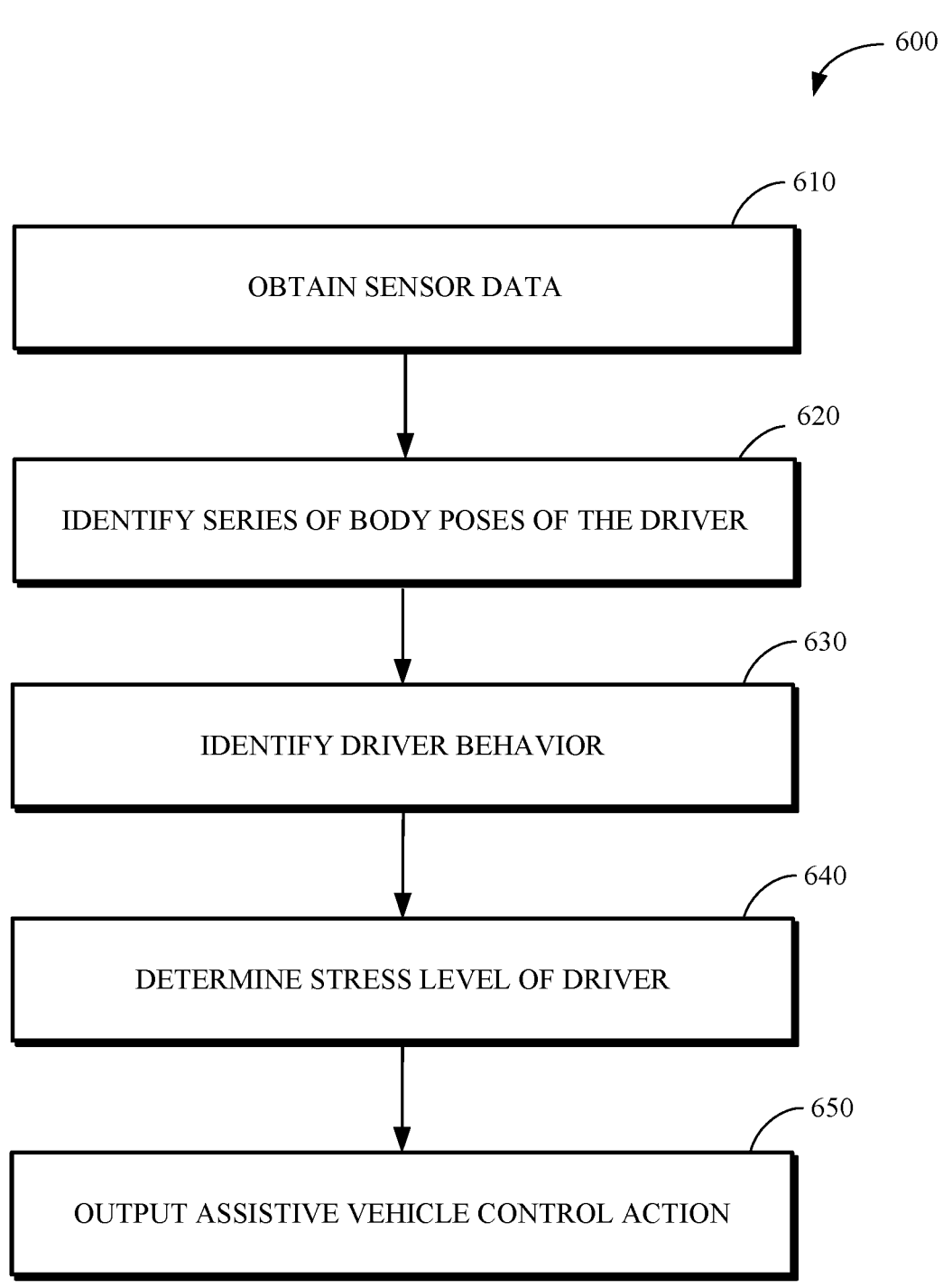
FIG. 6 is a flowchart diagram of an example of a technique for identifying a driver behavior and determining a stress level of the driver.

FIG. 6 is a flowchart diagram of an example of a technique for identifying a driver behavior and determining a stress level of the driver. The technique 600 may be implemented by a processor, such as the processor 133 of a vehicle (e.g., the vehicle 100 or the vehicle 210), a controller (such as the controller 130), sensor(s) (such as the sensors 136), other components of the vehicle, the human behavior estimate software 420, and/or other computing components. The technique 600 may be implemented in conjunction with the technique 500.

At 610, sensor data is obtained. The sensor data may include video data (e.g., the video data 412), eye tracking data (e.g., the eye tracking data 414), and/or biometric data (e.g., the biometric data 416). The sensor data may be obtained from one or more sensors in the vehicle, wearable device (e.g., wristwatch, headset), and/or any installed device (e.g., EEG installed on a headrest of driver seat in the vehicle). For example, the sensor data may include a video of the driver obtained at step 510 of FIG. 5.

At 620, a series of body poses of the driver is identified. The series of the body poses may be identified. The series of the body poses of the driver may be identified in a similar manner as described with respect to step 520 of FIG. 5 and the human behavior estimation software of FIG. 4, so the technique will not be repeated here.

At 630, the driver behavior is identified. The driver behavior may be identified in a similar manner as described with respect to step 530 of FIG. 5 and the human behavior estimation software of FIG. 4, so the technique will not be repeated here.

At 640, a stress level of the driver is determined. For example, when the driver exhibits behaviors that demonstrate irritability, anxiety or panic attacks, tremors or shaking, headaches, the biometric data (such as galvanic skin response, heartrate, EEG, fMRI, or other physiological or cognitive parameter) can be correlated with the driver behavior to determine the stress level of the driver. For example, the stress level of the driver may be determined as described above with respect to FIG. 4.

For example, the stress level of the driver can be determined based on a correlation between the biometric data and the driver behavior. For example, when the driver exhibits behaviors that demonstrate irritability, anxiety or panic attacks, tremors or shaking, headaches, the biometric data (such as galvanic skin response, heartrate, EEG, fMRI, or other physiological or cognitive parameter) can be correlated with the driver behavior to determine the stress level of the driver. For example, even when the driver exhibits behaviors that are not expressly associated with stress, such as when engaging in regular activity, those behaviors can be used along with biometric data analyze and/or determine the stress level based on reference data that indicates correlations between such behaviors and the biometric data.

In some implementations, the stress level of the driver can be determined based on a correlation between the biometric data, the driver behavior, and certain traffic situations. For example, the driver may be involved in traffic congestion or near-miss incidents or other incidents which may be stressful situations for the driver. In those situations, the driver may exhibit certain behaviors that they specifically have or go through. For example, when the driver behavior is determined based on patterns of the extracted signals, trained ML model and/or DL model, the driver behavior may also be determined and/or classified by certain traffic situations. For example, certain traffic situations can be determined based on scene understanding. Moreover, HD map data can be used in addition to such data obtained from the sensors to predict and interpret the traffic situation, and type of current road or upcoming road that the vehicle will be traversing.

At 650, assistive vehicle control action is output. For example, the assistive vehicle control action may be output in a similar manner as described with respect to step 540 of FIG. 5. Moreover, the assistive vehicle control action may be output based on the stress level of the user. For example, when the stress level is above a certain threshold (e.g., pre-determined threshold), the vehicle may automatically intervene with interactive controls such as turning down the radio or music volume, changing climate, and/or changing music, or the vehicle may take over the control of the vehicle such that the driving can be autonomously controlled.

Implementations according to this disclosure result in improvements to existing or conventional method of detecting and/or analyzing a human behavior or a driver behavior. Such improvements can be achieved by at least detecting and/or extracting landmark body points of a human or a driver represented in video frames or sensor data, determining differences between such landmark body points of adjacent video frames or the sensor data, and further processing the differences to determine significant changes in posture or the human behavior or the driver behavior. Moreover, stress level of the driver can be determined based on the driver behavior and biometric data. Moreover, the assistive vehicle control action in response to the driver behavior and/or stress level may be output.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or" unless specified otherwise, or clear from context. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method, comprising:
obtaining, using a camera facing a driver of a vehicle, a video of the driver in real-time during vehicle operation;
identifying a series of body poses, wherein each of the body poses is identified based on respective first subset of frames of the video by detecting landmark points associated with respective body parts of the driver, wherein the landmark points correspond to coordinates of joint positions;
determining changes in the series of body poses, wherein the changes correspond to combined Euclidean distance differences between corresponding landmark points of corresponding body parts in adjacent frames;
applying power transformation to the changes to obtain transformed data;

obtaining filtered data by applying a high-pass filter to the transformed data such that frequencies of signals representing slow changes in the series of the body poses that are less than a pre-determined threshold frequency are attenuated;
identifying a driver behavior based on the filtered data; and
automatically controlling the vehicle based on the driver behavior.

2. The method of claim 1, wherein the landmark points include coordinates representing joints of head, neck, torso, upper limbs, lower limbs, and spinal column of the driver.

3. The method of claim 1, wherein applying the power transformation comprises:
squaring the Euclidean distance differences, and wherein the high-pass filter attenuates frequencies less than a pre-determined threshold frequency.

4. The method of claim 1, the method further comprising:
extracting the video into segments responsive to determining that changes in the series of the body poses meet or exceed a pre-determined threshold condition, wherein the segments comprise the respective first subset of the frames.

5. The method of claim 1, the method further comprising:
obtaining biometric data of the driver; and
determining a stress level of the driver based on a correlation between the biometric data and the driver behavior.

6. The method of claim 5, wherein the biometric data correspond to at least one of galvanic skin response data, heartrate data, electroencephalogram data, or functional magnetic resonance imaging data.

7. The method of claim 1, wherein the landmark points correspond to three-dimensional coordinates including x, y, and z values for each joint position.

8. A vehicle comprising:
one or more sensors;
a memory; and
a processor configured to execute instructions stored in the memory to:
obtain, using a camera facing a driver of the vehicle, a video of the driver in real-time during vehicle operation;
identify a series of body poses, wherein each of the body poses is identified based on respective first subset of frames of the video by detecting landmark points associated with respective body parts of the driver, wherein the landmark points correspond to coordinates of joint positions;
determine changes in the series of body poses, wherein the changes correspond to combined Euclidean distance differences between corresponding landmark points of corresponding body parts in adjacent frames;
apply power transformation to the changes to obtain transformed data;
obtain filtered data by applying a high-pass filter to the transformed data such that frequencies of signals representing slow changes in the series of the body poses that are less than a pre-determined threshold frequency are attenuated;
identify a driver behavior based on the filtered data; and
automatically control the vehicle based on the driver behavior.

9. The vehicle of claim 8, wherein the landmark points include coordinates representing joints of head, neck, torso, upper limbs, lower limbs, and spinal column of the driver.

10. The vehicle of claim 9, wherein to apply the power transformation comprises to: square the Euclidean distance differences, and wherein the high-pass filter attenuates frequencies less than a pre-determined threshold frequency.

11. The vehicle of claim 9, wherein the processor is further configured to execute instructions stored in the memory to:

obtain biometric data of the driver; and determine a stress level of the driver based on a correlation between the biometric data and the driver behavior.

12. The vehicle of claim 11, wherein the biometric data corresponds to at least one of galvanic skin response data, heartrate data, electroencephalogram data, or functional magnetic resonance imaging data.

13. The vehicle of claim 8, wherein the processor is further configured to execute instructions stored in the memory to:

extract the video into segments responsive to determining that changes in the series of the body poses meet or exceed a pre-determined threshold condition, wherein the segments comprise the respective first subset of the frames.

14. The vehicle of claim 8, wherein the landmark points correspond to three-dimensional coordinates including x, y, and z values for each joint position.

15. A non-transitory computer readable medium storing instructions operable to cause one or more processors to perform operations comprising:

obtaining, using a camera facing a driver of a vehicle, a video of the driver in real-time during vehicle operation;

identifying a series of body poses, wherein each of the body poses is identified based on respective first subset of frames of the video by detecting landmark points associated with respective body parts of the driver, wherein the landmark points correspond to coordinates of joint positions;

determining changes in the series of body poses, wherein the changes correspond to combined Euclidean distance differences between corresponding landmark points of corresponding body parts in adjacent frames;

applying power transformation to the changes to obtain transformed data;

obtaining filtered data by applying a high-pass filter to the transformed data such that frequencies of signals representing slow changes in the series of the body poses that are less than a pre-determined threshold frequency are attenuated;

identifying a driver behavior based on the filtered data; and automatically controlling the vehicle based on the driver behavior.

16. The non-transitory computer readable medium of claim 15, wherein the landmark points include coordinates representing joints of head, neck, torso, upper limbs, lower limbs, and spinal column of the driver.

17. The non-transitory computer readable medium of claim 15, wherein applying the power transformation comprises:

squaring the Euclidean distance differences, and wherein the high-pass filter attenuates frequencies less than a pre-determined threshold frequency.

18. The non-transitory computer readable medium of claim 15, the operations further comprising:

extracting the video into segments responsive to determining that changes in the series of the body poses meet or exceed a pre-determined threshold condition, wherein the segments comprise the respective first subset of the frames.

19. The non-transitory computer readable medium of claim 15, the operations further comprising:

obtaining biometric data of the driver; and determining a stress level of the driver based on a correlation between the biometric data and the driver behavior.

20. The non-transitory computer readable medium of claim 15, wherein the landmark points correspond to three-dimensional coordinates including x, y, and z values for each joint position.

\* \* \* \* \*